Jan. 15, 1963  S. R. HOH  3,073,974
ENERGY CONVERTER
Filed June 17, 1959  6 Sheets-Sheet 1

INVENTOR.
SIEGFRIED R. HOH
BY
Thomas J. Kilgannon Jr.
AGENT

Jan. 15, 1963 S. R. HOH 3,073,974
ENERGY CONVERTER
Filed June 17, 1959 6 Sheets-Sheet 2
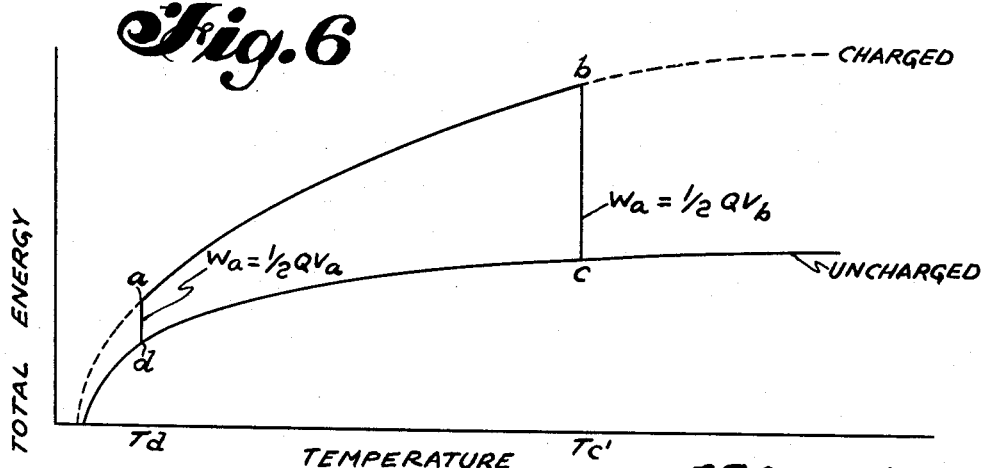
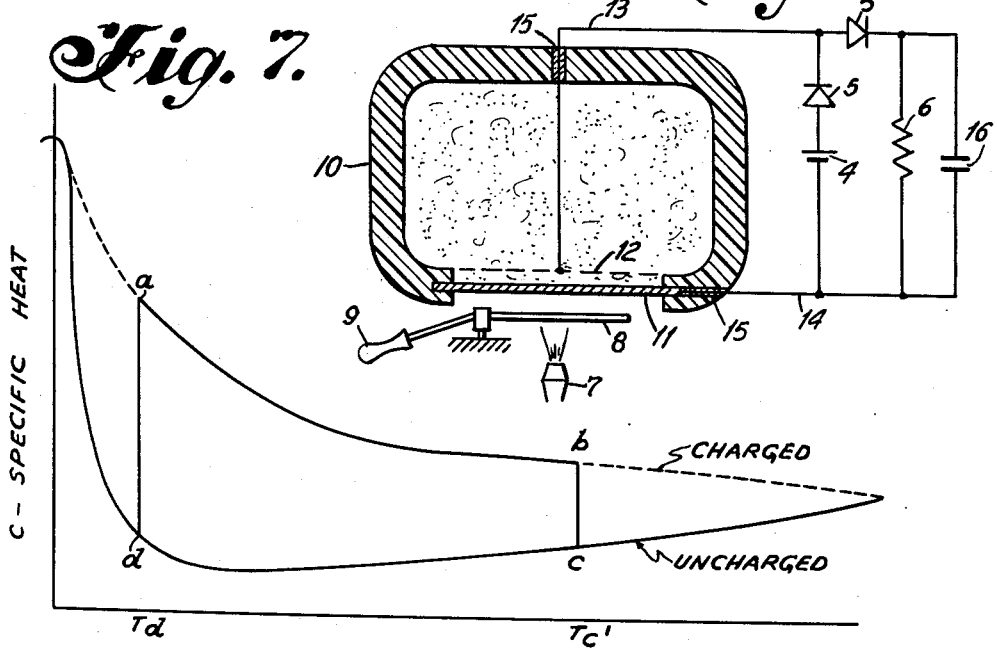
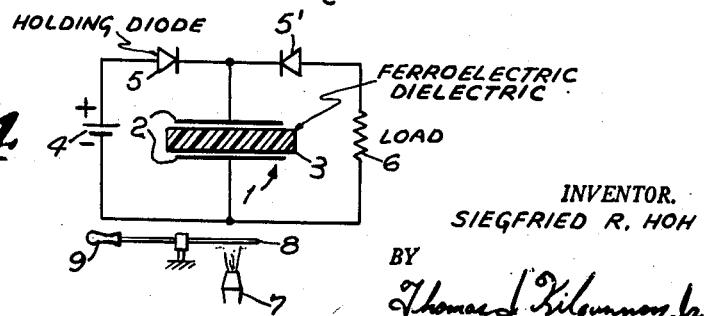
INVENTOR.
SIEGFRIED R. HOH
BY Thomas J. Kilgannon Jr.
AGENT

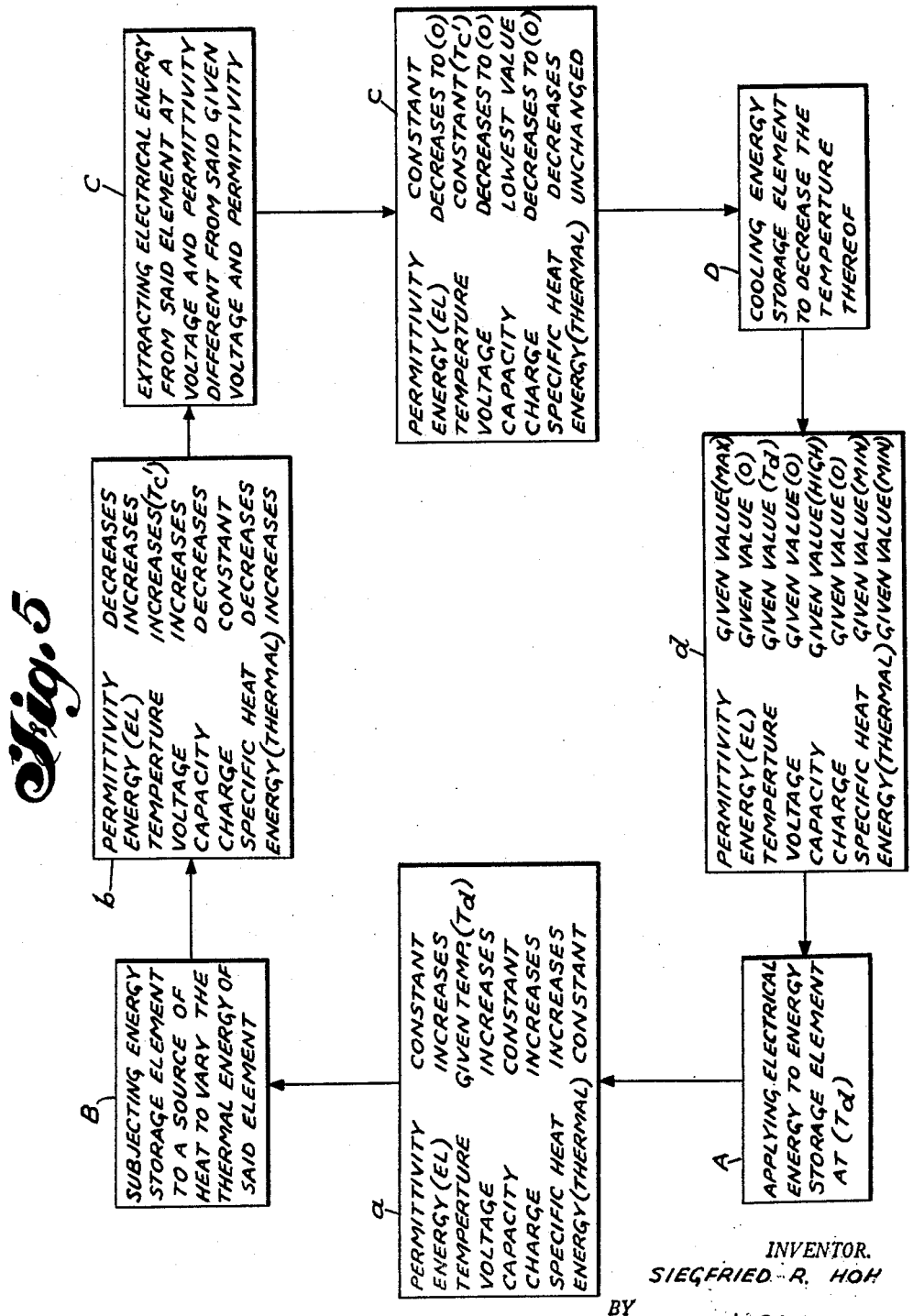

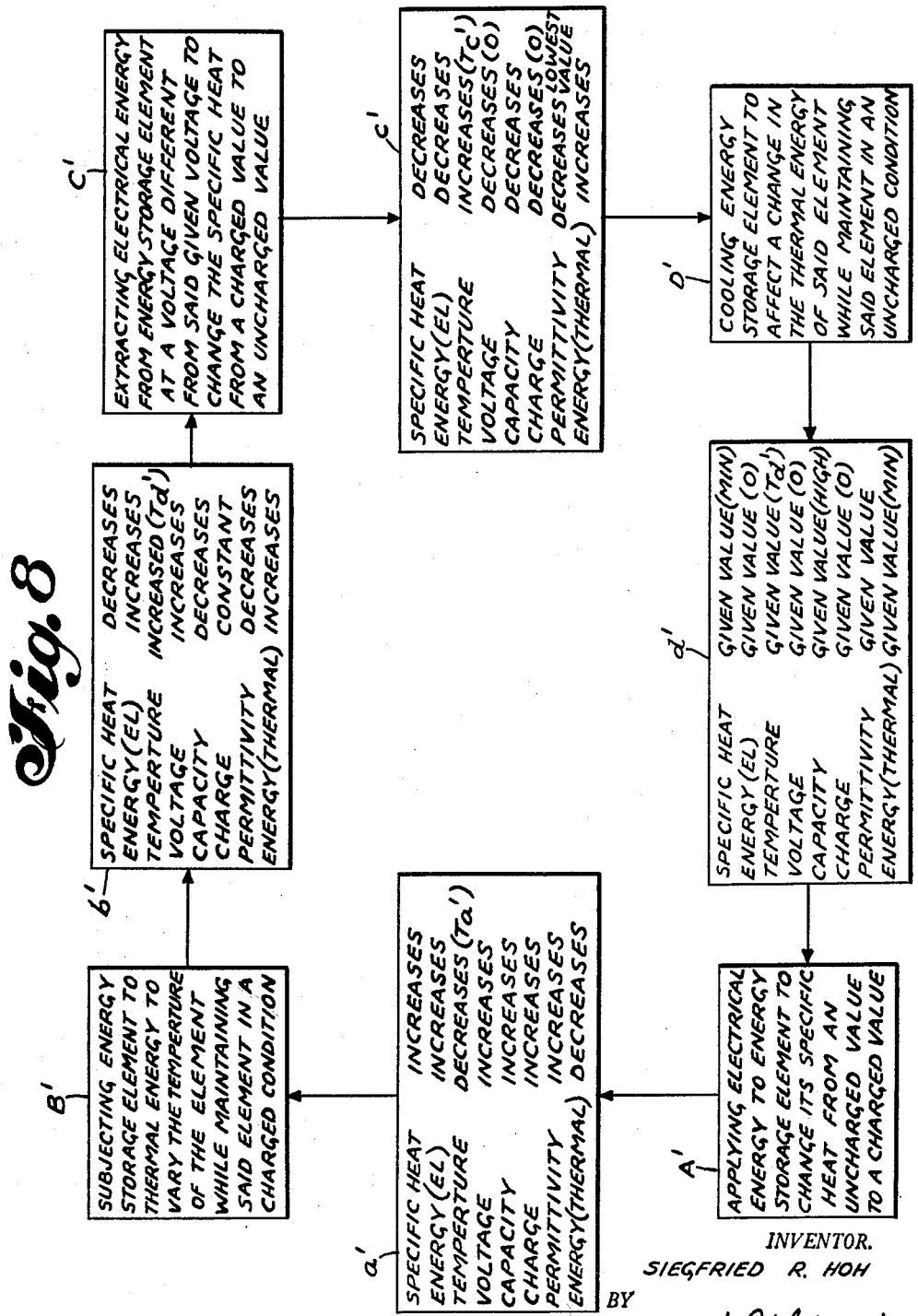

Jan. 15, 1963 S. R. HOH 3,073,974
ENERGY CONVERTER
Filed June 17, 1959 6 Sheets-Sheet 5

INVENTOR.
SIEGFRIED R. HOH
BY
Thomas J. Kilgannon Jr.
AGENT

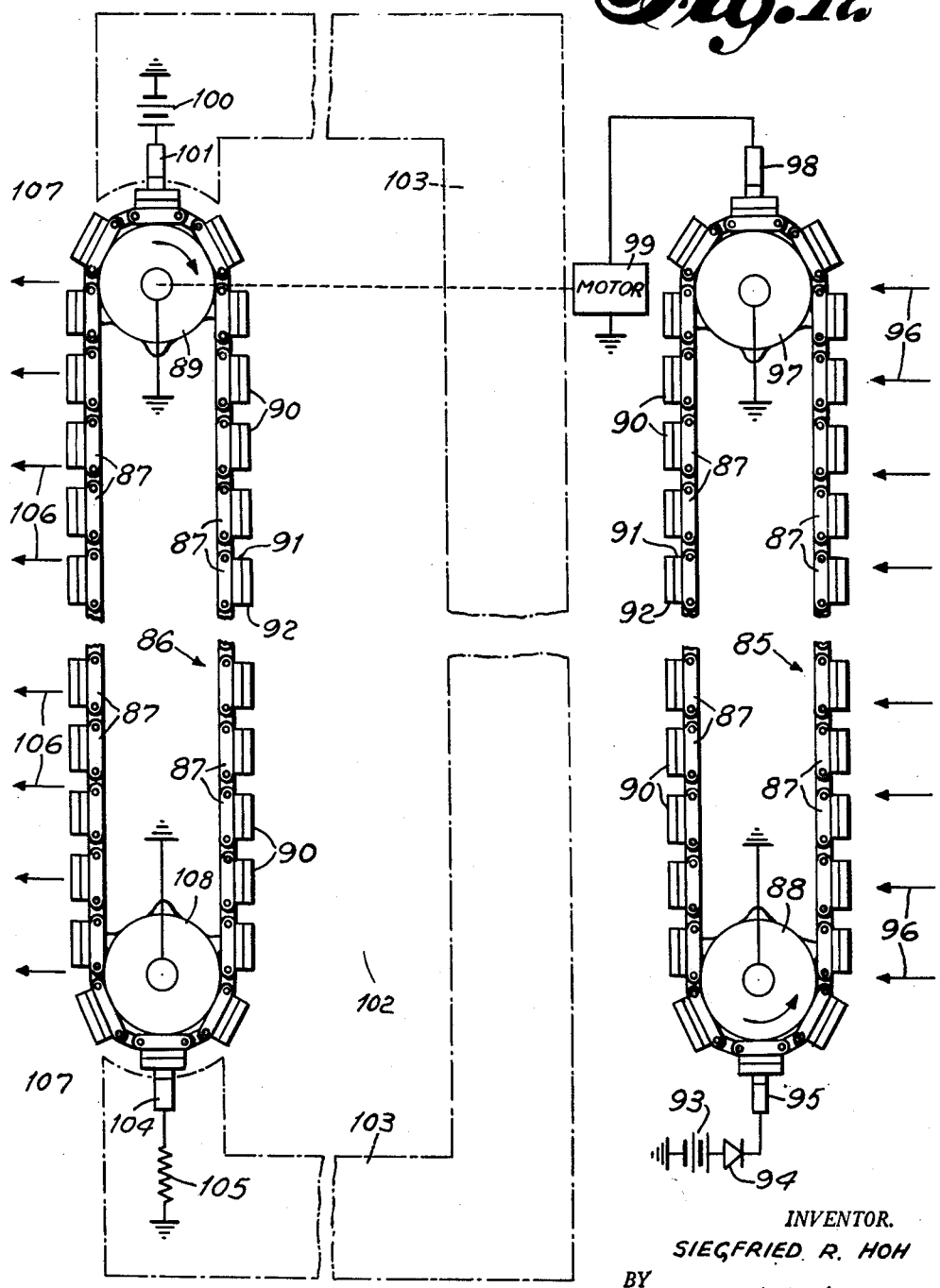

United States Patent Office 3,073,974
Patented Jan. 15, 1963

3,073,974
ENERGY CONVERTER
Siegfried Richard Hoh, Belleville, N.J., assignor to International Telephone and Telegraph Corporation, Nutley, N.J., a corporation of Maryland
Filed June 17, 1959, Ser. No. 821,029
7 Claims. (Cl. 307—149)

This invention relates to the conversion of energy between its thermal and electrical forms by the application of thermal energy to an element whose dielectric constant and specific heat varies with temperature. This invention discloses novel method and apparatus for producing refrigeration by the absorption and discharge of thermal energy from a closed system.

The present invention utilizes a phenomenon which may be termed the "thermo-dielectric effect." In a copending continuation in part application Serial No. 6,395, filed February 23, 1960, it is indicated that many substances, including liquids, gases and solids exhibit rather large variations in dielectric properties in response to temperature variations over a predetermined temperature range, and it is also indicated how this property may be used to provide high energy electric power from low energy sources of direct current, or from released bound charges associated with polarization of the substance. In the present application, a related, but distinctively different property of thermally variant dielectrics is considered. Specifically, the subject property concerns adiabatic variations in specific heat which occur when the subject material is either rapidly charged, or charged while thermally isolated from its surroundings. This variation is such that there is an apparent decrease in the temperature of the material so that upon exposure to the ambient environment the material would tend to absorb heat. Hence, applying sequential cycles of adiabatic charging, exposure to the interior of a thermally isolated enclosure, and adiabatic discharging followed by exposure to the exterior ambient environment, the basic element of this invention may be used to remove heat from, and thus refrigerate, the interior of the isolated enclosure.

It is therefore an object of this invention to provide a novel means for producing refrigeration.

Another object is to provide a novel heat transfer method, and apparatus therefor, which employs only simple and highly reliable components, and does not require circulating refrigerants.

A further object is to provide an energy converter and method of operation which provides refrigeration by direct absorption of thermal energy from a closed system.

In accordance with these objects a feature of this invention concerns the utilization in heat transfer apparatus, of energy converting elements having thermally sensitive dielectric properties.

Another feature is the utilization of an energy converting element which has different values of specific heat in the charged and uncharged condition.

Yet another feature is the utilization of dielectrics in which the change in temperature under adiabatic conditions, due to the change in specific heat by electrically charging, is greater than the change in temperature due to the heat developed by polarizing.

A still further feature is the utilization of a plurality of energy converting elements which are alternately exposed to a heat source and a heat sink to provide either an alternating or direct current output across a load which is coupled to the converter elements.

The above-mentioned and other features and objects of this invention will become more apparent by reference to the following description taken in conjunction with the accompanying drawings, in which:

FIG. 4 is a schematic diagram of the basic circuitry utilized in the converter for converting energy between thermal and electrical forms.

FIG. 5 is a block diagram which indicates the condition of the various parameters of the converter element of FIG. 4 at the end of each method step required to cause said element to operate as a converter from thermal energy to electrical energy.

FIG. 6 is a portion of the total energy vs. temperature curve of FIG. 2 enlarged to show the operating region of the converter.

FIG. 7 is a portion of the specific heat vs. temperature curve of FIG. 3 enlarged to show the operating region of the converter.

FIG. 8 is a block diagram which indicates the condition of the various parameters of the converter element of FIG. 4 at the end of each method step required to cause said element to operate as an absorber of thermal energy from a closed system.

FIG. 11 is a schematic representation of energy conversion apparatus which utilizes $H_2O$ as a dielectric in the converter element.

FIG. 12 is a schematic representation of energy conversion apparatus which utilizes thermal energy to provide refrigeration for an enclosed area.

Figure 1:
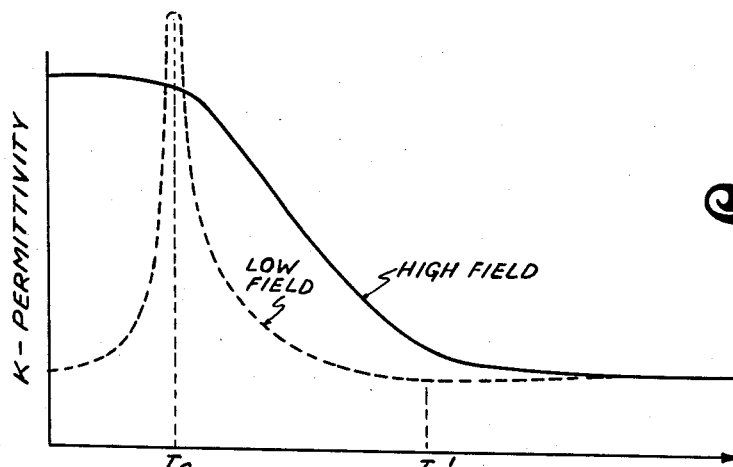
FIG. 1 is a curve of permittivity vs. temperature which is representative of the general characteristic required of dielectrics in accordance with the teaching of the invention under high and low field strength applications.
Figure 2:
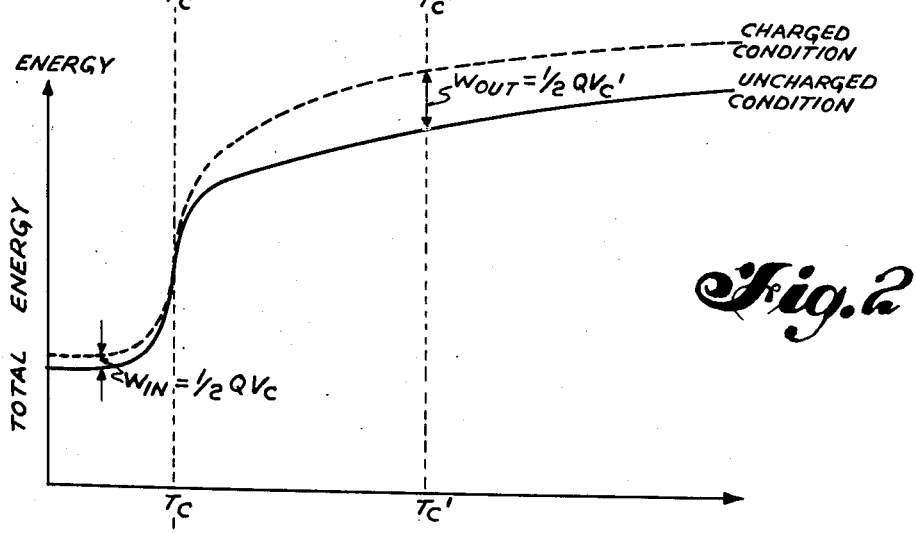
FIG. 2 is a curve of total energy vs. temperature for an energy converter element in the uncharged and charged states.
Figure 3:
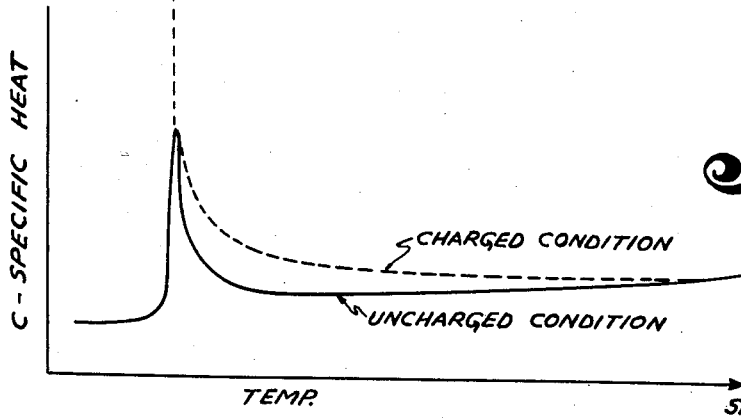
FIG. 3 is a curve of specific heat vs. temperature for an energy converter element in the uncharged and charged state.

Referring to FIGS. 1, 2 and 3, there is shown therein curves of permittivity, total energy and specific heat versus temperature which are representative of characteristics required of dielectrics which can be utilized in accordance with the teachings of the present invention. FIG. 1 indicates, for the purposes of this invention, that it is desirable to have relatively high values of dielectric constant at relatively low temperatures and relatively low values of dielectric constant at relatively high temperatures. Many dielectrics, such as ferroelectric materials of which barium titanate is a suitable example, possess characteristics such as just described. The values of permittivity obtained in the solid line curve of FIG. 1 have been obtained under high field strength conditions and, therefore, the peaking of the values of permittivity at a given temperature usually called the Curie temperature ($T_c$) does not appear on this solid line curve. The exhibition of a peaked value of permittivity at the Curie temperature is generally obtained when the values of permittivity are taken under relatively low field conditions and this characteristic is indicated in the dotted line curve of FIG. 1. Under high field strength conditions, therefore, the permittivity remains relatively high below the Curie temperature and, after the Curie temperature has been reached, the permittivity values gradually decrease until they level off at relatively low values of permittivity at relatively high values of temperature.

In FIG. 2 the curve of total energy vs. temperature is seen to exhibit a sharp increase in total energy both in the charged and uncharged condition in the region of the Curie temperature of the dielectric material being utilized.

At this temperature, a phase transition or change in the molecular structure of the dielectric occurs. Thus, in ferroelectric materials, of which barium titanate is representative, a phase transition of the crystal lattice occurs which is normally accompanied by a specific heat anomaly. The phase change in barium titanate is exhibited by a change in the crystal lattice structure from a tetragonal configuration to a cubic configuration. The sharp increase in thermal energy at the Curie temperature is also contributed to by what may be termed the destruction of spontaneous polarization which exists in the dielectric material until the Curie temperature is reached. Thus, the total energy due to thermal energy applied to a dielectric is indicated in FIG. 2 by the solid line curve entitled uncharged condition and the total energy due to the application of energy from thermal and electrical sources is shown by the dotted curve entitled charged condition. Thus, it may be seen that, for any given temperature, the difference between points on the charged and uncharged curves is the amount of electrical energy present and as will be explained hereinbelow is equal to $E_c = \frac{1}{2}QV$, where $Q$ is the charge on an energy storage element and $V$ is the voltage of said energy storage element.

The specific heat anomaly referred to above is shown clearly in FIG. 3. It should be noted that above the Curie temperature the given dielectric material starts to exhibit different values of specific heat at the same temperature for the charged and uncharged condition, and it is because of this phenomenon that the refrigerator embodiment of this invention can be made operable. It should also be noted that below the Curie temperature for any given temperature there is practically no difference in specific heat between the charged and uncharged condition and it should further be noted that at some point greatly in excess of the Curie temperature the values of specific heat for the charged and uncharged condition are the same. From the examples and explanations which follow hereinbelow, it will be seen that the region where the dielectric element exhibits two values of specific heat for a given value of temperature is the region to be utilized for the most efficient operation of the converter.

The principle of operation and the basic circuit of the ferroelectric energy converter of this invention may be understood with the aid of FIGURE 4 when taken in conjunction with the following description.

In FIG. 4, there is shown an energy storage element 1 made from a pair of oppositely disposed conductive plates 2 having a dielectric material 3, such as barium titanate, disposed therebetween. A source of electrical energy 4, such as a battery, is connected to the electrodes 2 of energy storage element 1 to apply a given charge to said energy storage element and a holding diode 5 having a high back voltage is utilized to maintain the energy storage element 1 at an elevated voltage level. A Zener diode 5' or similar switching element is utilized in series with the load and prevents the discharge of element 1 until a given voltage is reached. Of course, the breakdown voltage of the diode 5' is less than the breakdown voltage of holding diode 5. A utilization device or load 6 is coupled to conductive electrodes 2 of energy storage element 1. A source of thermal energy 7 is disposed externally of energy storage element 1 and may consist of any heat source such as the sun, a gas flame or natural steam. A means 8 to expose energy storage element 1 to source of thermal energy 7 is shown in FIG. 1 in the form of a mechanical shutter which is disposed between heat source of thermal energy 7 and energy storage element 1. Shutter 8 may be actuated mechanically by means of handle 9, for instance, or by any other suitable electrical or mechanical means.

In operation, the energy storage element 1 of the circuit of FIG. 4 is maintained in a charged state by means of battery 4 through holding diode 5 which has a high back voltage. Energy storage element 1 is charged at a given temperature shown as $T_c$ in FIG. 1. The point $T_c$, in FIG. 1, is the Curie temperature, but under conditions of high field strength operation, the temperature $T_c$ may be slightly above or below the Curie temperature, since there is no appreciable change in the values of permittivity in this region. Thus, if storage element 1 is at the temperature $T_c$, its capacitance $C_c$ is at a maximum due to the high permittivity $K_c$ as seen from a consideration of FIG. 1. The electrical charge on energy storage element 1 is, therefore, $$Q = C_c \cdot V_c$$

where $V_c$ is the voltage of battery 4. The electrical energy stored in the capacitor is given by:

$$W_c = \frac{1}{2} Q \cdot V_c$$

If thermal energy is applied to energy storage element 1 from source of thermal energy 7 the temperature of energy storage element 1 rises to a temperature $T_c'$ and its permittivity drops to $K_c'$ in accordance with the curve shown in FIG. 1. There is a corresponding drop in capacitance 2

$$C_c' = \frac{K_c'}{K_c} \cdot C_c$$

Since the charge $Q$ cannot decrease because of holding diode 5, there must be a rise of capacitor voltage from $V_c$ to $V'_{c'}$ by the factor $$\frac{K_c}{K_c'}$$

The conservation of charge requires:

$$Q = C_c V_c = C_c' V_c' = \frac{K_c'}{K_c} C_c V_c' = \text{constant}$$

It follows that $$V_c' = \frac{K_c V'}{K_c'}$$

and since $$\frac{K_c}{K_c'}$$

is greater than unity, it follows that $V_c'$ is greater than $V_c$. Thus, the capacitor voltage has been stepped up by heating energy storage element 1. The increased voltage of energy storage element 1 also means an increase of electrical energy $W$ by the factor $$\frac{K_c}{K_c'}$$

because $$W_c' = \frac{1}{2} Q \cdot V_c' = \frac{1}{2} Q \cdot V_c \cdot \frac{K_c}{K_c'}$$

The energy increase $$\Delta W = W_c' - W_c = \frac{1}{2} Q V_c \left( \frac{K_c}{K_c'} - 1 \right) = \frac{1}{2} Q \Delta V$$

is due to the conversion of thermodynamic or heat energy into electrical energy as will be seen from the discussion which follows hereinbelow.

The same basic circuitry of FIG. 4 may be utilized in operating energy storage element 1 as a heat absorber from a closed system. The only distinctions would be that source of thermal energy 7 would be a finite source of heat such as from a closed room which is to be refrigerated. From the equation $$H_e \approx C.T.M$$

wherein:

$H_e$=thermal energy contained in a given body,
$C$=specific heat of said given body,
$T$=temperature of said body,
$M$=mass of said body, it may be seen that if the heat energy of a body remains constant and the specific heat is increased, it follows that the temperature of the body must decrease in order to maintain the heat energy at the given value. Considering the foregoing statement with the specific heat vs. temperature curve of FIG. 3, it can be seen that by applying electrical energy to energy storage element 1, the specific heat of element 1 is changed from an uncharged value to a charged value. If this is done under adibatic conditions, it follows that the temperature of the element must decrease if the thermal energy stored in element 1 is to remain constant. There is, however, a contribution of thermal energy due to the so-called heat of polarization. This thermal energy change, due to the heat of polarization, is believed, however, to be relatively small and does not increase the total thermal energy significantly. In view of this, it is believed that the change in specific heat is great enough to provide a net drop in temperature rather than a rise in temperature. Thus, if there were no change in specific heat the temperature of the element would increase. The temperature change due to polarization, therefore, is believed to be substantially less than the change in temperature due to the changes in specific heat. In this manner, then the change in specific heat between the charged and uncharged conditions plays an important part in the operation of energy storage element 1 as an absorber of heat from a closed system.

Referring now to FIGS. 5, 6 and 7, the method of operation of energy storage element 1 as a converter is shown and in FIG. 5 the condition of the various parameters of energy storage element 1 is indicated at the end of each method step. The condition of energy storage element 1 as to total energy and as to specific heat is shown in FIGS. 6 and 7 respectively, at the end of each method step to indicate clearly the gain in electrical energy and the variation in the specific heat as both electrical and thermal energy are applied to energy storage element 1. In FIG. 5, block (d) shows the various parameters involved and indicates what the condition of these parameters should be at the start of the conversion cycle.

The initial conditions of the various parameters of element 1, then, are as follows: The permittivity of the dielectric 3 utilized in element 1 of FIG. 4 is at a given value which should be a maximum value within the temperature range being utilized. This is in accordance with the curve of FIG. 1 and with the theory that energy storage element 1 should be charged up initially at a relatively high value of permittivity. FIG. 5 indicates that the electrical energy is zero and the points $d$ in FIGS. 6 and 7 indicate, respectively, the total energy and specific heat of energy storage element 1 in the uncharged state.

The first step in the method of converting thermal energy into electrical energy is indicated in FIG. 5 at A. Thus, the first step is that of applying electrical energy to energy storage element 1 of FIG. 4 from battery 4 at a given point in the usable temperature range. This given temperature, $T_d$ is indicated in FIGS. 6 and 7 as a temperature which is slightly above the Curie temperature $T_c$ of the dielectric material. The given temperature, however, may be the Curie temperature $T_c$ or may be a temperature in excess or below the Curie temperature of energy storage element 1. The temperature $T_d$ as shown in FIGS. 6 and 7, has been chosen slightly in excess of the Curie temperature because it is at this point that the dielectric constant is at a maximum for this cycle, under high field strength conditions, and it is the point at which a minimum change in temperature is required to obtain the greatest gain in electrical energy. In FIG. 5, then, the condition of the various parameters after applying electrical energy at a given temperature is shown in block (a). Thus, the electrical energy, the voltage and the charge of energy storage element 1 increase, while the thermal energy, the permittivity and the capacity of energy storage element 1 remain constant.

The temperature is indicated in FIGS. 6 and 7 as having remained at the temperature $T_d$. The temperature, however, tends to decrease, as can be recognized from the fact that the specific heat has increased in FIG. 7 from point $d$ to point $a$. This increase in specific heat ordinarily would be indicative of a drop in the temperature of converter or energy storage element 1 but, for the purposes of this exposition, it is assumed that, as the specific heat changes, sufficient thermal energy is absorbed to maintain element 1 at the temperature $T_d$. In FIG. 6, therefore, the line $da$ represents the amount of electrical energy added to the already present thermal energy of energy storage element 1 and this electrical energy is equal to $$W_a = \tfrac{1}{2} Q.V$$

Referring again to FIG. 5, the next step in the method is indicated at B and is the step of subjecting element 1 to a source of thermal energy to vary the thermal energy of said element thereby varying the permittivity and electrical energy of energy storage element 1. After heating, block (b), in FIG. 5, indicates the condition of the various parameters of energy storage element 1. The temperature has increased to a value $T_c'$ as shown in FIG. 6 and FIG. 7 and the permittivity, in accordance with the curve of FIG. 1 has decreased to a relatively low value at the temperature $T_c'$. As a result of this decrease in permittivity the voltage of element 1 increases and, therefore, the electrical energy of energy storage element 1 increases; the charge having remained constant due to the presence of diodes 5 and 5' of FIG. 4 while the voltage across the element was increasing. Since thermal energy is being added to energy storage element 1, it is expected that the thermal energy would increase. The thermal energy does increase but not in proportion to the amount of thermal energy added. It is at this point, then, that a conversion of energy between its thermal and electrical forms takes place.

The conversion mechanism may be explained as follows: Part of the applied thermal energy is expended to randomize the aligned electric dipoles of the polar dielectric material being utilized. This energy appears as added electrical energy on a capacitive storage element such as element 1. The mechanical equivalent would be a capacitor in which part of the dielectric is withdrawn from the capacitor across the electrodes of which an electric field exists. In this instance, as in the instance of applying thermal energy, the work expended appears as an increased voltage and results in increased electrical energy in the capacitor.

The increase in voltage at the end of step B, has been experimentally verified. A ferroelectric capacitor similar to element 1 of FIG. 1 was prepared from a thin sheet of a barium strontium titanate having dimensions of approximately ½ x 2 x .005 inches and having a Curie temperature of 35° C. The low field permittivity K, at this point was approximately 10,000. The capacitor was utilized in a circuit similar to that shown in FIG. 4 and the load connected across the output terminals was a vacuum tube voltmeter. An infrared lamp was used as a heat source. Upon heating from room temperature, the capacitor first reached the Curie temperature, $T_c$, of approximately 35° C. The vacuum tube voltmeter at this point read essentially the voltage of the charging battery 4. On further heating, the capacitor voltage rose above the voltage of charging battery 4 and at a temperature of approximately 90° C., the capacitor voltage had more than tripled. The value of the permittivity at the 90° temperature had dropped to approximately one third of its original value as measured at 35° C. Values of voltage of 76 volts and 260 volts were obtained at the Curie temperature and at 90° C. respectively. Since the energy under constant Q conditions is proportional to the voltages at the two temperatures the energy gain is proportional to the voltage at 90° C. divided by the voltage at the Curie temperature and in this instance equals an energy gain of 3.4. By alternately cycling the temperature between the two points mentioned, the voltage increased to the higher value of voltage each time the source of thermal energy was applied to the energy storage element 1.

In FIG. 5, then, the total energy of energy storage element 1 has increased from a to b along line ab and in FIG. 6, the specific heat has decreased from point a to point b along line ab. In this connection, it should be noted that while the specific heat has been shown as decreasing in FIG. 7, it is not necessary that the specific heat change occur in this way. Since the specific heat function is the derivative of the total energy curves in the charged and uncharged condition, the specific heat could increase, decrease or remain constant without adversely affecting the operation of energy storage element 1.

The next step in converting thermal energy to electrical energy is shown at C in FIG. 5 and is the step of extracting electrical energy from energy storage element 1 at a voltage and permittivity different from the initial voltage and permittivity. Block (c) of FIG. 5, then, shows the conditions of the various parameters after extracting electrical energy from energy storage element 1. It should be noted on the curves of FIGS. 6 and 7 that the discharge of energy storage element 1 takes place from point b on the charged condition curves to point c on the uncharged condition curves and that the temperature is shown as remaining at the temperature $T_c'$ during this operation. The length of line bc is indicative of the amount of electrical energy obtained by discharging energy storage element 1 and is notably greater in length than the line da which is the amount of electrical energy supplied by charging element 1. The difference in the lengths of the lines bc and da is, then, equal to the amount of electrical energy gained by application of thermal energy to converter element 1.

The final step in the method is shown in FIG. 5 at D and is the step of cooling element 1 to decrease the temperature thereof thereby returning the temperature of said element to said given temperature. The cooling step may be carried out in any well known manner but the simplest of these methods is that shown in FIG. 4 wherein a mechanical shutter B is utilized to block the flow of thermal energy from source 7 to element 1. In this manner, the heat absorbed by element 1 is allowed to radiate to the ambient value of temperature. Referring again to curves 6 and 7 it may be seen that the temperature has decreased at the end of the cooling step from $T_c'$ to $T_d$ and that both the total energy and the specific heat of element 1 are at the values which were described as the initial conditions.

From the foregoing, it may be seen that all that is required to provide an electrical output which has been amplified over the original input is to provide thermal energy to a storage element, the characteristics of which, notably permittivity, change with temperature upon the application of thermal energy to the storage element.

Figure 9:
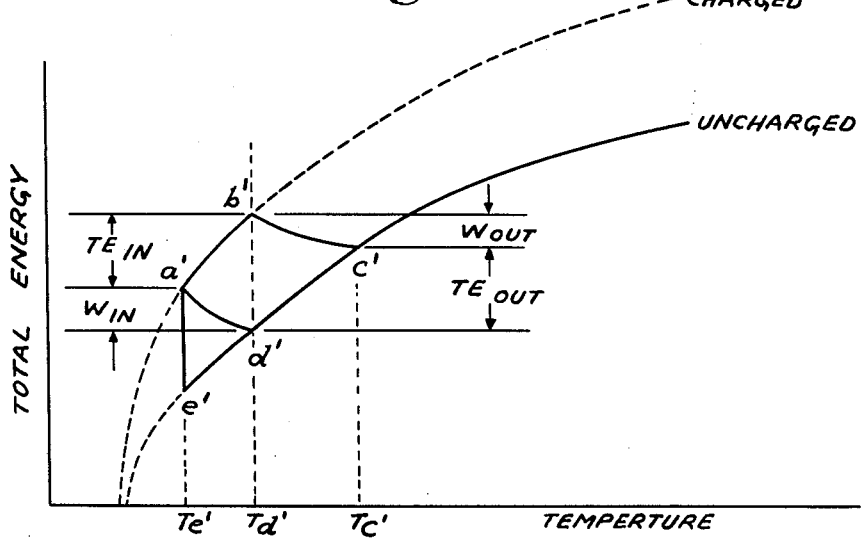
FIG. 9 is a portion of the total energy vs. temperature curve of FIG. 2 enlarged to show the region of operation of the refrigerator.
Figure 10:
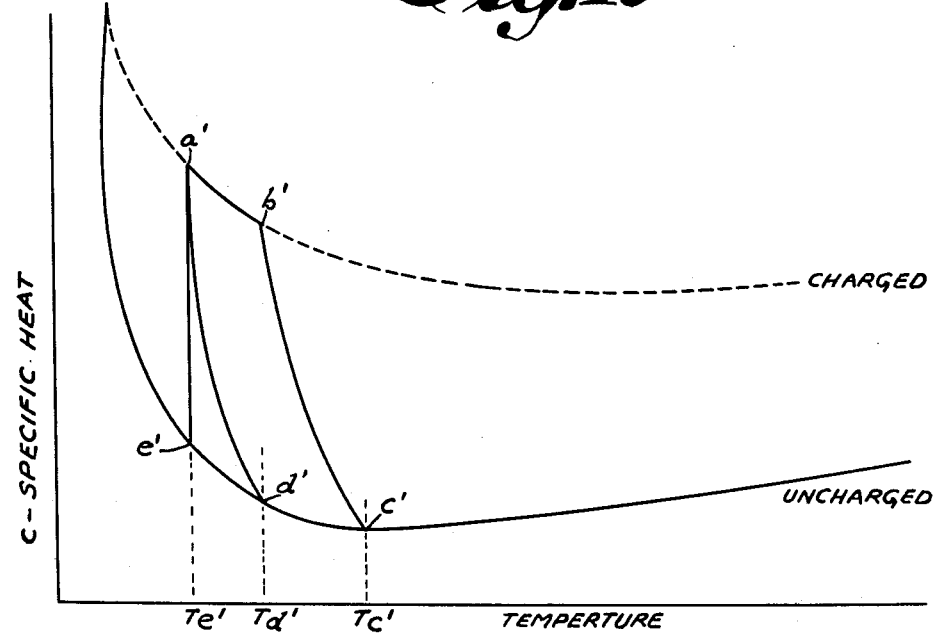
FIG. 10 is a portion of the specific heat vs. temperature curve of FIG. 3 enlarged to show the region of operation of the refrigerator.

Referring now to FIGS. 8, 9 and 10, in FIGURE 8 there is shown the variation of the different parameters of energy storage element 1 at the end of each of the method steps which are performed to cause energy storage element 1 to act as a refrigerator or as an absorber of heat from a closed system. FIG. 9 shows the variation in total energy with temperature as the steps of the method are performed on energy storage element 1, and FIG. 10 shows how the specific heat vs. temperature characteristic is affected in the course of operating energy storage element 1 as a refrigerator. The basic method steps as outlined in connection with the converter embodiment of FIG. 5 are the same when operating energy storage element 1 as a refrigerator with the exception that certain criteria as to operating temperatures and ranges of specific heat must be strictly adhered to in order to obtain refrigerator operation. The values of the parameters shown in block (d') of FIG. 8 correspond to the values of the parameters given for energy converter element 1 in block (d) of FIG. 5. The first step shown at A' in FIG. 8 in the operation of energy storage element 1 as a cooling device is the step of applying electrical energy to energy storage element 1 at a given voltage within a given temperature range to change the specific heat from an uncharged value to a charged value. This step includes the step of either rapidly charging or thermally isolating element 1 from its surroundings to maintain adiabatic charging conditions. The given temperature range may be defined as a range wherein the differences in specific heat between the charged and uncharged condition are increasing as the temperature increases. It is in this range that no violation of the second law of thremodynamics takes place nor is there any violation of the law of conservation of energy. Referring now to FIGS. 9 and 10 and to block (a') of FIG. 8, it can be seen that the total energy and specific heat have increased and the temperature of energy storage element 1, because of the change in specific heat, has dropped below that of the ambient temperature shown as $T_d'$ in FIGS. 9 and 10. Temperature $T_d'$ is a temperature slightly above the Curie temperature and is in the region where the permittivity is decreasing as the temperature increases. The temperature then, in dropping to the temperature of point a' causes a slight increase in permittivity. The drop in temperature occurs due to the change in specific heat and predominates over the increase in temperature due to the liberation of the so-called heat of polarization. The temperature therefore, is not forced to remain constant as with the converter element but rather is allowed to drop as a prelude to the next step in the method as shown in FIGS. 9 and 10. Thus, it can be seen in FIGS. 9 and 10 at point a' that the energy of the applied charge has been absorbed within the element in the form of a structural variation which increases the capacity of the element to absorb thermal energy.

The next step, shown at B' in FIG. 8, is the step of applying thermal energy to energy storage element 1 to vary the temperature of the element while maintaining element 1 in a charged condition. This step includes the step of connecting element 1 to a source of thermal energy. In this instance, the source of thermal energy would be some enclosed system such as a room which is to be cooled by the absorption of heat therefrom. Thus, at the end step A', the total energy and specific heat as shown at a' in FIGS. 9 and 10 respectively, at a temperature lower than the heat sink or ambient temperature $T_d'$. In these same figures, after energy storage element 1 has been heated as shown in step B', the total energy and specific heat are shown at point b' on these curves. These points are shown at the temperature $T_d'$ which is the ambient temperature or the temperature of a heat sink and is the maximum point to which the temperature of element 1 is allowed to rise. This is a practical consideration, however, for if the temperature of the system which is to be cooled is higher than ambient the simplest approach would be to connect the closed system to the ambient heat sink and permit the closed system to be cooled by radiation and conduction. The criterion to be fulfilled here is that thermal energy be taken on at a temperature lower than ambient and discharged at a temperature higher than ambient temperature.

In FIG. 10, it can be seen that the specific heat decreases from point $a'$ to point $b'$. It is not necessary that the specific heat act in this manner in order to obtain operation of energy storage element as a cooling means. Thus, the slopes of the curves of FIG. 9 govern the shapes of the curves of FIG. 10. The curve of FIG. 9 is, in turn, governed by the permittivity characteristic of the particular dielectric material being utilized. Thus, if the characteristics of the dielectric material being utilized can be controlled, as for instance, by introducing appropriate impurities into barium titanate, the characteristic of the total energy curves can be controlled and therefore, the specific heat characteristics. It can be seen, then, that it is incidental whether the specific heat increases, decreases or remains at the same value over a given temperature range. The criterion to be fulfilled here is that the differences in the values of specific heat, over a given temperature range, for the charged and uncharged condition should be increasing as the temperature increases.

Step C', shown in FIG. 8, is the next step in the method of utilizing energy storage element 1 in a refrigerator and is the step of extracting electrical energy from element 1 at a voltage different from said given voltage within said given temperature range to change the specific heat from a charged value to an uncharged value. As a result of this step, as shown in FIGS. 9 and 10 at point $c'$, the electrical energy has decreased, the temperature has increased above sink temperature and the thermal energy of storage element 1 has increased. The temperature at point $c'$ is now higher than the sink temperature which was $T_b'$ and it is now possible to discharge thermal energy from a higher temperature level to a lower temperature level, temperatures $T_c'$ and $T_d'$, respectively. The electrical energy at this point has decreased because of the discharge of energy storage element 1. However, the amount of energy available on discharge is less than the amount of energy which was introduced in the step of charging energy storage element 1 in accordance with the second law of thermodynamics. The difference in electrical energy introduced and the amount of electrical energy available on discharge has been utilized or converted in increasing the thermal energy of energy storage element 1. Thus, more thermal energy is available at the end of step C' than was introduced during step B'. This increase in thermal energy and the simultaneous change in specific heat due to the discharge of energy storage element 1 contribute toward raising the temperature to a temperature $T_c'$ which may be much higher than the sink temperature $T_d'$. A consideration of FIG. 1 at this point will indicate that the permittivity has at temperature $T_c'$ decreased to its lowest value and that in accordance with the change in permittivity the electrical energy at the end of step B' has increased but nevertheless, as indicated in FIG. 8, the amount of electrical energy obtained at the end of step C' has decreased from the electrical energy available at that point due to the conversion of some of that electrical energy into thermal energy. Step C' includes the step of disconnecting energy storage element 1 from the system being cooled and connecting to a heat sink. The final step, D', is that of cooling energy storage element to affect a change in the thermal energy of element 1 thereby varying the temperature of element 1 within said given temperature range while maintaining element 1 in an uncharged condition. In this way, then, cooling of element 1 may take place by radiation, convection and conduction to the surrounding atmosphere or may be directly cooled using well known coolant fluids. At the end of step D', then, the various parameters involved have returned to the valves as indicated in block ($d'$) and, as shown in FIGS. 9 and 10, the total energy has decreased to point $d'$ at the starting temperature $T_d'$ and the specific heat has returned to the initial value of specific heat at the same temperature. Thus, one cycle in the operation of energy storage element 1 as a refrigerator has been completed. It is clear, then, that by repeatedly cycling energy storage element 1, in the same manner as described above it is possible to absorb heat from a closed system thereby cooling that closed system. This, cooling of course, only occurs provided that thermal energy is being removed from the closed system faster than it is being gained from other sources.

In connection with the foregoing cycle, it is significant to note that the charge and discharge portion of the cycle have taken place adiabatically rather than by charging and forcing the temperature to remain constant as has been done in the case of the converter. Of further significance, at this point, is the fact that energy converter 1 operating in the region where the differences in specific heat are increasing while the temperature is increasing will operate as an energy converter provided energy storage element 1 is cycled in the following way. Referring now to FIGS. 9 and 10, the cycle should begin at point $e'$ on these curves. By applying heat to energy converter 1 the temperature is raised from $T_e'$ at point $e'$ to the temperature $T_d'$ at point $d'$. At this point, electrical energy is applied to energy storage element 1 and element 1 is allowed to charge up adiabatically as was done in the case of the refrigerator embodiment; the total energy and specific heat being indicated in FIGS. 9 and 10 as before. At point $a'$, then, if the capacitor were discharged, the total energy and specific heat would tend to change along the lines $a'$, $d'$ provided this cycle is completely reversible. However, by forcing the element 1 to remain at the temperature $T_e'$ and discharging along lines $a'e'$ in FIGS. 9 and 10, it is possible to obtain converter action in that more electrical energy is obtained at the output than was placed on energy storage element 1. Thus, there is a net gain in electrical energy and thermal energy has been converted into electrical energy. This operation is not restricted to the particular area shown in FIGS. 9 and 10 but may be carried out at any point on these curves provided the charging of energy converter 1 is accomplished adiabatically and the discharge is accomplished isothermally. It is, of course, apparent that the greatest change in electrical energy available can be obtained in the region of the knee of the curves of FIG. 9. This method of energy conversion is relatively inefficient when compared with the method outlined in connection with FIG. 5, but is interesting from the point of view that if we reverse this cycle and charge up isothermally along lines $e'a'$ in FIGS. 9 and 10 and discharge along line $a'd'$ adiabatically, the temperature of the converter element will be elevated to the temperature of point $d'$. From this, it can be seen that more thermal energy is available than was available at the start of this cycle and that converter 1, in this method of operation, is acting as a heat pump to deliver thermal energy. A conversion of energy has taken place, therefore, and this is indicated by the fact that there is less electrical energy available at the output than was placed on the element at the input.

It should also be noted that the points $a'$ and $d'$, in the refrigerating cycle of FIG. 9, are fixed points while $b'$ and $c'$ vary so that the line $b'c'$ approaches the line $a'd'$ as the interior temperature of the cooled enclosure decreases. In the limit, $T_c'=T_d'$, and no further cooling is possible.

Up until this point, the dielectric material utilized in energy converter 1 has been referred to as a solid dielectric material, such as barium titanate. It is well known, however, that many such dielectric materials having desirable characteristics like barium titanate exist. These solid materials can be utilized equally well in the structure of this invention. The dielectrics capable of utilization in the practice of this invention however, are not limited to solid dielectrics, but rather dielectrics in any state, be it solid, liquid or vapor can be utilized. A converter or refrigerator element may be designed which incorporates a dielectric which assumes two of its three possible states. A dielectric such as pure water, $H_2O$, is such a dielectric and when utilized in its liquid and vapor forms in connection with capacitive energy storage elements, an effective converter of thermal to electrical energy and an effective absorber of thermal energy can be obtained. Referring to FIG. 11, there is shown therein a closed dielectric envelope 10 which is designed to be capable of withstanding considerable internal pressures. A metallic electrode 11 is disposed internally of dielectric envelope 10 and at the base thereof. Metallic electrode 11 may be a separate sheet of metal lying adjacent the bottom surface of envelope 10 or may be a metallic film deposited by well known deposition techniques, vacuum evaporation, for instance. Another electrode in the form of a grid 12 to facilitate vaporization of the $H_2O$ dielectric upon application of thermal energy is spaced from and is disposed in parallel relationship with metallic electrode 11. Electrodes 11 and 12, then, form the plates of a capacitive element similar to that described in connection with energy storage element 1 of FIG. 1. Leads 13 and 14 connect electrodes 11 and 12, respectively, through seals 15 to external circuitry which consists of a source of electrical energy 4, a holding diode 5, and a utilization device 6 similar to those shown in FIG. 1. Holding diodes 5 prevent deleterious feed back during the cooling portion of the cycle to be described hereinbelow. A condenser 16 is connected in parallel across load 6 to prevent source of electrical energy 4 from discharging through load 6 at all times. Enclosed within dielectric envelope 10 is a given volume of highly purified water, $H_2O$. The given volume of water is sufficient to completely fill the space between electrodes 11 and 12, thereby forming a capacitive element having water in the liquid state as its dielectric. Pure water in liquid form is known to have a permittivity of approximately 80. By removing water from between electrodes 11 and 12, after charging the condenser formed by these electrodes with water therebetween, it is possible to obtain a substantial gain in energy by simply changing the state of the dielectric. This change of state can be accomplished by opening shutter means 8 thereby exposing the dielectric envelope 10 to thermal energy from source of thermal energy 7. By applying thermal energy to envelope 10 the volume of water disposed therein and between electrodes 11 and 12 is heated sufficiently to cause the water to vaporize and pass through grid electrode 12 and fill envelope 10 with water vapor. By this means, the permittivity of the water vapor takes the place of what was formerly the permittivity of water in its liquid state. Because of the pressure build up in dielectric envelope 10, the total energy curve will have a similar configuration to that shown in FIG. 2, both for the charged and uncharged conditions. A closed system, with its consequent pressure build-up, is not necessary for the operation of this device as shown. It may be operated at constant pressure. The exposition made hereinabove requires a less complex analysis and was shown for the sake of clarity.

Since such devices as described in connection with FIG. 11 which utilize water as a dielectric require a large amount of energy to provide for the heat of vaporization, the best point at which to operate such a device is somewhere near the upper portion of the knee of the curve shown in FIG. 2. At this point, a small change in thermal energy will convert the water which is in a droplet condition between electrodes 11 and 12 into a vapor. Thus, an amplification of electrical energy which was initially placed on the condenser of FIG. 11 can be obtained by applying thermal energy to vaporize the dielectric thereby changing its state. The gain obtained will be proportional to the difference between the value of permittivity in the liquid and the value of permittivity in the vapor state. The foregoing technique may be applied equally as well with other dielectric materials which can be vaporized upon the application of thermal energy among these are dielectrics such as certain fluorohydrocarbons, formamide, hydrocyanic acid, hydrogen fluoride, dimethylsulfate and ammonia. It should be noted that these materials not only exhibit large changes in permittivity with temperature, but also possess high dielectric strengths in the vapor state.

The device of FIG. 11 may likewise be operated as an absorber of thermal energy in much the same manner as has been described in connection with FIG. 8. Thus, by applying electrical energy to the capacitor formed by electrodes 11 and 12 with a dielectric of water vapor therebetween, the specific heat of the water vapor is increased and the temperature drops below that at which the charge was initially applied. By connecting this condenser to a system which is to be cooled, the condenser will absorb heat until the ambient temperature is reached. At this point, the condenser is disconnected from the closed system which is being cooled and connected to a heat sink which is at ambient temperature. The condenser is then discharged and the specific heat is reduced to an uncharged value and the temperature is increased to some value above the ambient temperature thereby permitting thermal energy at a high temperature to be discharged into a sink of lower thermal energy. Thus, depending upon the temperature one wishes to cool from or upon the temperatures one wishes to utilize in order to gain energy, dielectrics having different vaporization temperatures and different changes in permittivity may be utilized and the method and apparauts of this invention may be applied equally well in conditions where the dielectric is a solid, a liquid or a gas or wherein the dielectric undergoes a transition of phase or state.

It is obvious that the foregoing embodiments are given as examples and do not include all possible design variations. The design and choice of the ferroelectric material is highly dependent on the application and on the available temperature differentials. The Curie temperatures of presently known ferroelectric materials range from 15° K. for lead niobate to 840° K. for lead metaniobate. Potassium niobate is another high temperature material with a Curie point of appoximately 700° K. Also, so-called anti-ferroelectric materials, such as lead zirconate, are suitable because of their high gradient of permittivity versus temperature near the Curie point. It is also possible to operate ferroelectric power generators in subfreezing temperature ranges. A suitable material is Rochelle salt which changes its permittivity by a ratio of 400 to 1 when changing temperature from −20° C. to −80° C.

Extremely high voltages may be obtained by cascading several stages of converter capacitors in such a fashion that the output voltage of a preceding stage is utilized to charge the capacitor of a following stage. An arrangement which utilizes this technique for high voltage generation is shown in FIG. 18. FIG. 18 shows four converter capacitors 70, 71, 72 and 73 attached to a rotating cylindrical or spherical body 74 which forms a common outside electrode for the aforementioned capacitors. The body 74 is heated by a source 75 at its topmost portion and cooled by a heat sink 76 to a relatively low temperature. In operation, battery 77 charges capacitor 70 through a high resistance charging resistor 78. Body 74 is thereupon rotated 90° such that capacitor 70 is heated by radiant energy 75 thereby increasing the voltage across capacitor 70 in proportion to the change in permittivity caused by heating. At this point, capacitor 70 is allowed to discharge through diode 80 into capacitor 71. Capacitor 71, it should be noted, has a greater thickness of dielectric than capacitor 70 to prevent breakdown because of the higher voltages across it and to decrease the capacity of capacitor 71. Since the charge being circulated remains constant, if the voltage is increased the capacity must decrease to compensate for the increase in voltage and this in accomplished in each of the capacitors by increasing the thickness of the dielectric in the succeeding capacitor. As body 74 is rotated about axis 81, capacitor 71 is heated and discharges through a diode into capacitor 72 which is in turn heated and discharged into capacitor 73. Capacitor 73, upon being heated, is charged to the highest voltage possible and this energy is discharged through load 79 which can be any utilization device such as a particle accelerator. In this embodiment, the initial priming charge is recirculated upon discharge and no battery power is utilized other than the priming power and that utilized to make up for losses due to leakage current.

Referring now to FIG. 12, there is shown therein another practical application of the ferroelectric energy converters utilizing barium titanate elements as converters and refrigerators. FIG. 12 shows two belts 85, 86 made of a plurality of articulately interconnected links 87 which are driven in a given direction by sprocket wheels 88, 89, respectively. Belt 85 is driven by wheel 88 which is in turn driven by a motor not shown in FIG. 12. A plurality of ferroelectric capacitive energy storage elements 90 are disposed in spaced relationship on the surface of belts 85, 86. The belt links 87 may form one electrode, the ground electrode, of the elements 90 and the elements 90 would then consist of a grounded electrode 87, a dielectric 91 and a second electrode 92. In accordance with the teaching of this invention, a battery 93 is utilized to place an initial charge on elements 90 through a holding diode 94, as each element 90 passes in a counter-clockwise direction under brush 95. As elements 90 pass beyond brush 95, they are exposed to radiant energy 96, as from the sun, which increases the temperature of the elements 90 thereby increasing the voltage across elements 90. As elements 90 pass around idler wheel 97, elements 90 are discharged through a pick-off brush 98 which applies the energy discharged to motor 99 which operates on a unidirectional current. The input to motor 99, of course, may be filtered to provide a fairly smooth current flow. Motor 99 is coupled to sprocket wheel 89 which drives belt 86 having energy storage elements 90 disposed thereon. Energy storage elements 90 on belt 86 are charged from a battery 100 or from output 98 through brush 101 thereby decreasing the temperature of elements 90 in accordance with the teaching of the operation of this invention as a heat absorber from a closed system. Sprocket wheel 89 rotating in a clockwise direction carries elements 90 into a closed space 102 bound by wall 103 which may be a room or some chamber one wishes to cool. Elements 90 which are at a temperature lower than ambient due to the charging step absorb thermal energy from closed system 102. Approaching idler wheel 108, the temperature of elements 90 is at or near the ambient temperature and elements 90 are discharged at this point, through brush 104 to load 105. Elements 90, after discharge, are carried on belt 86 from closed system 102 and allowed to radiate thermal energy 106 which is at a higher temperature than ambient causing the discharge of thermal energy to the ambient atmosphere 107. The load 105 could, of course, be a battery which could then be utilized to operate the motor which drives belt 85.

Other modifications of the arrangement of FIG. 12 are possible which are indicative of the utility of such a service. Alternate elements of elements 90 could be charged up, for instance, to opposite polarities by utilizing two batteries and two brushes. Then by discharging through a single brush an alternating current output could be obtained from belt 85, the frequency of which would be governed by the speed of the belt. The speed of the belt, however, would be governed by the thermal inertia of elements 90.

It should be noted that ferroelectric energy storage elements can be manufactured utilizing thin films for both the dielectric portion and for the metallic electrodes.

While I have described above the principles of my invention in connection with specific apparatus, it is to be clearly understood that this description is made only by way of example and not as a limitation to the scope of my invention as set forth in the objects thereof and in the accompanying claims.

I claim:

1. A method of employing a capacitive element having differences in specific heat between the charged and uncharged conditions over a given temperature range for converting between energies in thermal and electrical form comprising applying electrical energy to said element at a given voltage within said given temperature range to change the specific heat from an uncharged value to a charged value subjecting said element to a source of thermal energy to vary the temperature of said element within said given temperature range while maintaining said element in a charged condition, extracting electrical energy from said element at a voltage different than said given voltage within said given temperature range to change the specific heat from a charged value to an uncharged value, and cooling said element to affect a change in the thermal energy of said element thereby varying the temperature of said element within said given temperature range while maintaining said element in an uncharged condition.

2. A method of employing a capacitive element according to claim 1 wherein said differences in specific heat between the charged and uncharged condition are increasing as the temperature increases over at least a portion of said given temperature range.

3. A method of employing a ferroelectric element having a maximum permittivity at its Curie temperature and permittivities substantially less than said maximum permittivity at temperatures above and below said Curie temperature, the steps comprising applying electrical energy to said element at ambient temperature to charge said element to a given voltage at a given temperature, subjecting said element to a source of thermal energy to increase the temperature thereof to a temperature greater than said given temperature but less than said ambient temperature thereby decreasing its permittivity and increasing its voltage to a voltage greater than said given voltage, extracting electrical energy from said element at a voltage greater than said given voltage and at a temperature greater than said given temperature but less than said ambient temperature, and exposing said element to said ambient temperature to decrease the temperature thereof thereby returning said element to said ambient temperature.

4. A method according to claim 3, wherein said ambient temperature is in the region of and includes the Curie temperature of said element.

5. A method of employing an element having a characteristic specific heat which varies with an adiabatically applied electric charge over a given temperature range comprising the steps of adiabatically charging said element at a given temperature in said temperature range thereby cooling said element, exposing said element to a thermally isolated enclosure to absorb heat therefrom, adiabatically discharging said element to further increase the temperature thereof by decreasing the specific heat, and exposing said element to a heat sink maintained at said given temperature to transfer heat from said element to said heat sink.

6. Thermodielectric heat transfer apparatus comprising at least one thermodielectric capacitor element having a specific heat characteristic which varies with an adiabatically applied electric charge, charging means coupled to said element for adiabatically transferring an electrica charge to said element, a thermally isolated enclosure, first means coupled to said element for thermally linking said element to said enclosure, discharge means coupled to said element for adiabatically discharging said element, an ambient heat sink, second means coupled to said element for thermally linking said element and said heat sink, and cyclic control means for cyclically and sequentially coupling said element to said charging means, said first means, said discharging means and said second means, to thereby charge said element so as to absorb heat from said enclosure and to discharge said element to increase the temperature thereof and thereby deliver said absorbed heat to said heat sink.

7. Apparatus according to claim 6 wherein said cyclic control means comprises a motor, an endless belt operated by said motor, each point of said belt communicating in sequence with said charging means, said enclosure, said discharging means and said heat sink, and means for mounting each said element on said belt.

References Cited in the file of this patent
UNITED STATES PATENTS

| | | |
|---|---|---|
| 2,087,003 | Miller | July 13, 1937 |
| 2,413,391 | Usselman | Dec. 31, 1946 |
| 2,567,373 | Giacolleto et al. | Sept. 11, 1951 |
| 2,669,665 | Annis et al. | Feb. 16, 1954 |
| 2,915,652 | Hatsopoulus et al. | Dec. 1, 1959 |